(12) United States Patent
Cho et al.

(10) Patent No.: US 7,885,647 B2
(45) Date of Patent: Feb. 8, 2011

(54) SECURE BOOTING METHOD AND MOBILE TERMINAL FOR THE SAME

(75) Inventors: Sung-Goo Cho, Yongin-si (KR); Gi-Bong Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 786 days.

(21) Appl. No.: 11/513,809

(22) Filed: Aug. 31, 2006

(65) Prior Publication Data

US 2007/0083760 A1    Apr. 12, 2007

(30) Foreign Application Priority Data

Oct. 11, 2005    (KR) .................. 10-2005-0095305

(51) Int. Cl.
*H04W 88/02* (2009.01)
(52) U.S. Cl. .................................... 455/418
(58) Field of Classification Search ......... 455/404–406, 455/410–411, 418–419; 380/240; 370/338, 370/401; 711/152; 717/168, 173, 174; 713/2, 713/168
See application file for complete search history.

(56) References Cited

U.S. PATENT DOCUMENTS

| | | | |
|---|---|---|---|
| 6,219,652 B1 * | 4/2001 | Carter et al. ................ 705/59 |
| 6,661,710 B2 * | 12/2003 | Kwon ...................... 365/185.24 |
| 7,181,472 B2 * | 2/2007 | Cameron et al. ............. 707/201 |
| 7,200,390 B1 * | 4/2007 | Henager et al. ............. 455/419 |
| 2003/0084342 A1 | 5/2003 | Girard |
| 2004/0054907 A1 | 3/2004 | Chateau et al. |
| 2005/0138409 A1 | 6/2005 | Sheriff et al. |
| 2005/0143059 A1 | 6/2005 | Imura ......................... 455/419 |
| 2006/0095454 A1 * | 5/2006 | Shankar et al. ............. 707/101 |
| 2006/0274695 A1 * | 12/2006 | Krishnamurthi et al. .... 370/331 |
| 2008/0209516 A1 * | 8/2008 | Nassiri .......................... 726/3 |

FOREIGN PATENT DOCUMENTS

| | | |
|---|---|---|
| EP | 1523203 A | 4/2005 |
| KR | 1020040003853 | 1/2004 |
| KR | 1020050034955 | 4/2005 |
| WO | WO 98/12891 | 3/1998 |

* cited by examiner

*Primary Examiner*—Diane Mizrahi
(74) *Attorney, Agent, or Firm*—F. Chau & Associates, LLC

(57) ABSTRACT

A secure booting method for a mobile terminal comprising: checking configuration information stored in a non-volatile memory embedded in the mobile terminal to determine whether the configuration information is effective when the mobile terminal is booted, connecting the mobile terminal with a host to copy a downloader and a downloader certificate from the host when it is determined that the configuration information is not effective, performing authentication of the copied downloader using the downloader certificate and an authentication key stored in the mobile terminal, and downloading a program stored in the host to the non-volatile memory using the downloader when the downloader is authenticated.

14 Claims, 7 Drawing Sheets

SECURE BOOTING METHOD AND MOBILE TERMINAL FOR THE SAME

CROSS-REFERENCE TO RELATED PATENT APPLICATION

This application claims priority to Korean Patent Application No. 2005-0095305, filed on Oct. 11, 2005, in the Korean Intellectual Property Office, the disclosure of which is incorporated by reference herein.

BACKGROUND OF THE INVENTION

1. Technical Field

The present disclosure relates to a secure booting method for a mobile terminal, and more particularly, to a method of authenticating a certificate stored in a downloader or a mobile terminal when booting the mobile terminal.

2. Discussion of the Related Art

Security methods have been developed for preventing a lost or stolen mobile terminal from being improperly used by persons other than the owner. One such method makes use of an International Mobile Equipment Identity (IMEI) element.

However, one who acquires a lost or stolen mobile terminal can still use the mobile terminal either by changing the IMEI stored in the mobile terminal, or by replacing the flash memory and downloading software from a host to store a certificate and application code with a new IMEI.

Therefore, a need exists for a security method for preventing illegal software download or illegal change of an IMEI when a mobile terminal is booted.

SUMMARY OF THE INVENTION

According to an exemplary embodiment of the present invention, there is provided a secure booting method for a mobile terminal. In the secure booting method, configuration information stored in a non-volatile memory in the mobile terminal is checked to determine whether the configuration information is effective when the mobile terminal is booted. The mobile terminal is connected with a host and a downloader and a downloader certificate are copied from the host when it is determined that the configuration information is not effective. Authentication of the copied downloader is performed using the downloader certificate and an authentication key stored in the mobile terminal. A program stored in the host is downloaded to the non-volatile memory using the downloader when the downloader is authenticated.

According to an exemplary embodiment of the present invention, there is provided a mobile terminal including a memory storing a first program, a non-volatile memory, and a processor to execute the first program. According to the program, the processor checks configuration information stored in the non-volatile memory to determine whether the configuration information is effective when the mobile terminal is booted, connects the mobile terminal with a host and copies a downloader and a downloader certificate from the host when it is determined that the configuration information is not effective, performs authentication of the copied downloader using the downloader certificate and an authentication key stored in the mobile terminal, and downloads a second program stored in the host to the non-volatile memory using the downloader when the downloader is authenticated.

BRIEF DESCRIPTION OF THE DRAWINGS

The above and other features of the present invention will become readily apparent by describing in detail exemplary embodiments thereof with reference to the attached drawings in which.

DETAILED DESCRIPTION OF EXEMPLARY EMBODIMENTS

Figure 1:
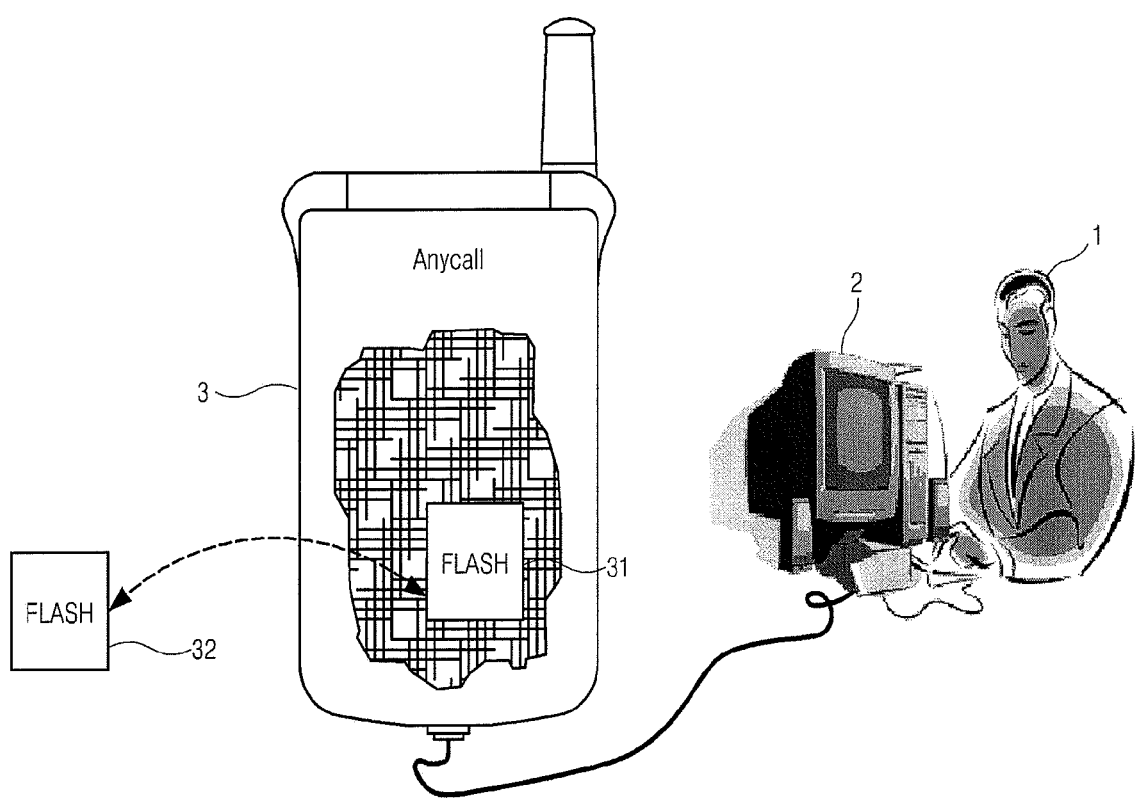
FIG. 1 illustrates a user attempting to illegally download software to a mobile terminal.

Hereinafter, the exemplary embodiments will be described in detail with reference to the attached drawings. Like reference numerals in the drawings denote like elements.

FIG. 1 illustrates a user 1 attempting to illegally download software to a mobile terminal 3. Referring to FIG. 1, the user 1 obtains the mobile terminal 3 which had been lost or stolen and accesses a host 2 to illegally download software or change an IMEI allocated to the mobile terminal 3. Alternately, the user 1 can use the mobile terminal 3 illegally by replacing a flash memory 31 embedded into the mobile terminal 3 with a new flash memory 32.

Figure 2:
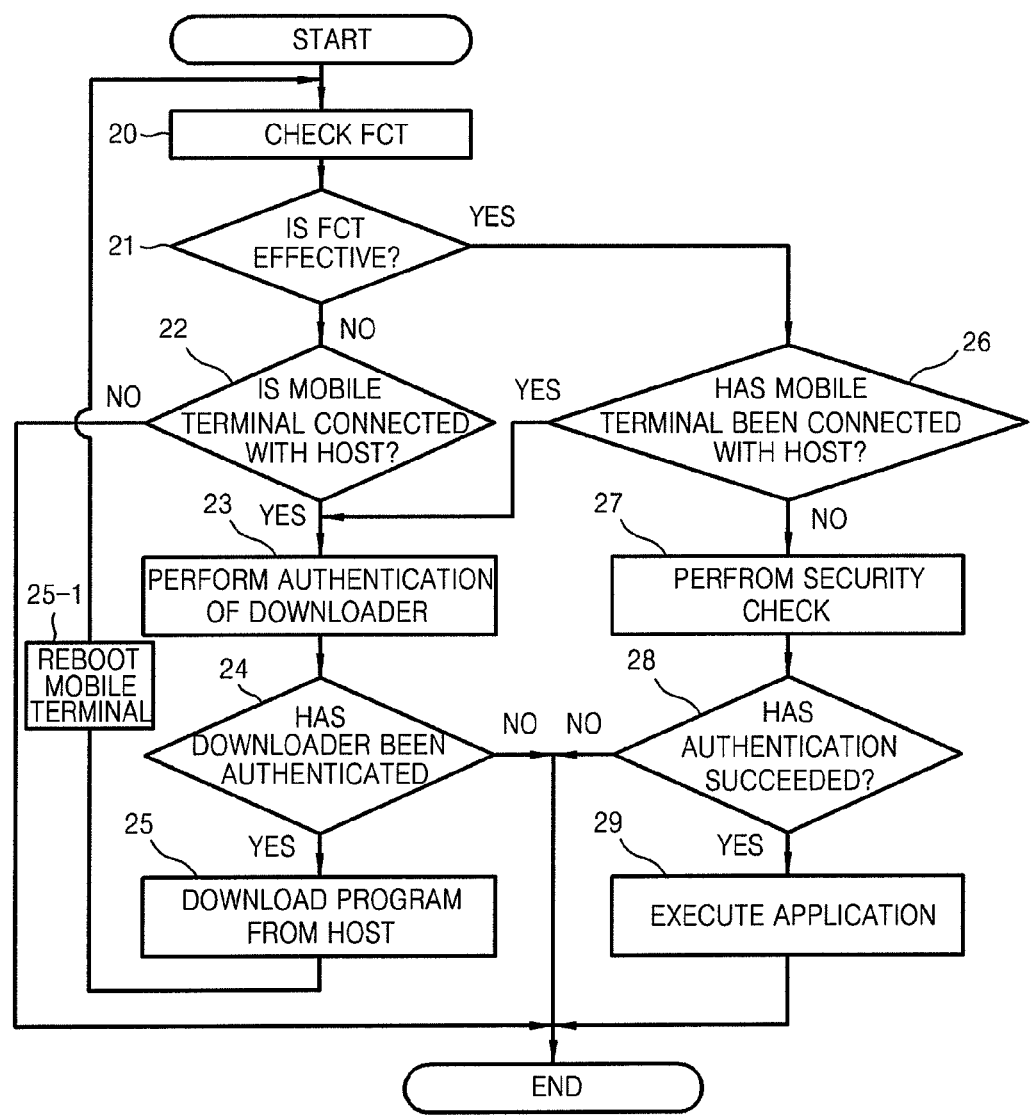
FIG. 2 is a flowchart of a secure booting method for a mobile terminal, according to an exemplary embodiment of the present invention.
Figure 3:
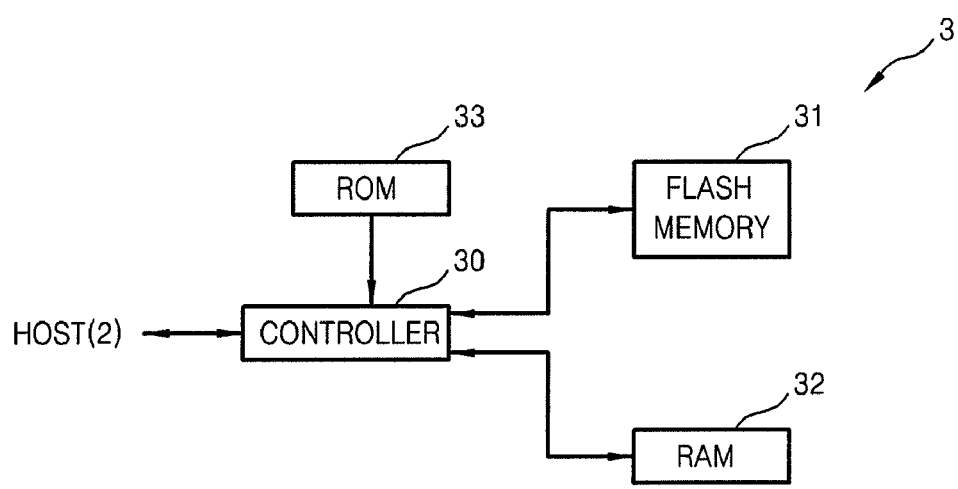
FIG. 3 is a block diagram of a mobile terminal according to an exemplary embodiment of the present invention.

FIG. 2 is a flowchart of a secure booting method for the mobile terminal 3, according to an exemplary embodiment of the present invention. FIG. 3 is a block diagram of the mobile terminal 3, according to an exemplary embodiment of the present invention. Referring to FIG. 3, the mobile terminal 3 includes a control unit 30, a flash memory 31, a random access memory (RAM) 32, and a read-only memory (ROM) 33.

The ROM 33 stores a control program for the booting and operation of the mobile terminal 3 and a public key of a manufacturer. The flash memory 31 stores a certificate and an application code. The RAM 32 stores a second stage loader (SSL) and a downloader certificate for the authentication of the downloader.

When the mobile terminal 3 is turned on or reset, the control unit 30 checks whether flash configuration table (FCT) information is stored in the flash memory 31 according to a booting algorithm stored in the ROM 33 in operation 20. When it is determined that the flash memory 31 is empty or the FCT information is not effective in operation 21, the control unit 30 tries to connect the mobile terminal 3 with the host 2 in operation 22. When the control unit 30 fails to connect with the host 2 in operation 22, booting is not performed and the secure booting method ends.

When the control unit 30 succeeds in connecting with the host 2 in operation 22, the control unit 30 copies an SSL and a downloader certificate from the host 2 to the RAM 32 using a first stage loader (FSL) and performs authentication of the SSL using the downloader certificate stored in the RAM 32 in operation 23.

Figure 4:
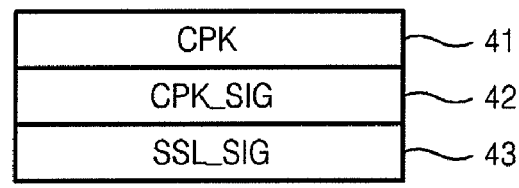
FIG. 4 illustrates the structure of a downloader certificate according to an exemplary embodiment of the present invention.

FIG. 4 illustrates the structure of a downloader certificate according to an exemplary embodiment of the present invention. The downloader certificate includes a customer public key (CPK) 41, a CPK signature (CPK_SIG) 42, and an SSL signature (SSL_SIG) 43.

The control unit 30 performs authentication of the CPK 41 of the downloader certificate using the CPK_SIG 42 and the manufacturer's public key stored in the ROM 33. In addition, the control unit 30 performs authentication of the SSL using the authenticated CPK 41 and the SSL_SIG 43. When the downloader is not authenticated in operation 24, download from the host 2 is not carried out and the secure booting method ends.

When the downloader is authenticated, the control unit 30 downloads all of a program stored in the host 2 other than the SSL and the download certificate using the SSL and stores the downloaded program in the flash memory 31 in operation 25.

After the download from the host 2 is completed, the control unit 30 terminates a current downloading process and reboots the mobile terminal 3 in operation 25-1. Thereafter, the above-described operations are repeated starting from operation 20.

Figure 5:
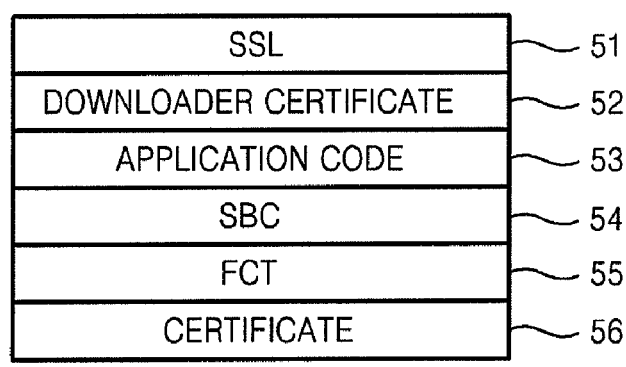
FIG. 5 illustrates the structure of a program stored in a host to be used for download, according to an exemplary embodiment of the present invention.

FIG. 5 illustrates the structure of the program stored in the host 2 to be used for download, according to an exemplary embodiment of the present invention. Referring to FIG. 5, the program includes an SSL 51, a downloader certificate 52, an application code 53, a simple boot code (SBC) 54, an FCT 55, and a certificate 56. The FCT 55 is the same as the FCT checked in operation 20.

When it is determined that the FCT stored in the flash memory 31 is effective in operation 21, the control unit 30 determines whether the mobile terminal 3 has been connected with the host 2 in operation 26. When it is determined that the mobile terminal 3 has been connected with the host 2, the control unit 30 determines which application program or the like to download from the host 2 and performs authentication of the downloader in operation 23. The downloader authentication and the downloading process are performed through operations 23 through 25, as described above.

When it is determined that the mobile terminal 3 has not been connected with the host 2 in operation 26, the control unit 30 performs a security check on the mobile terminal 3 using the certificate 56 stored in the flash memory 31 in operation 27.

Figure 6:
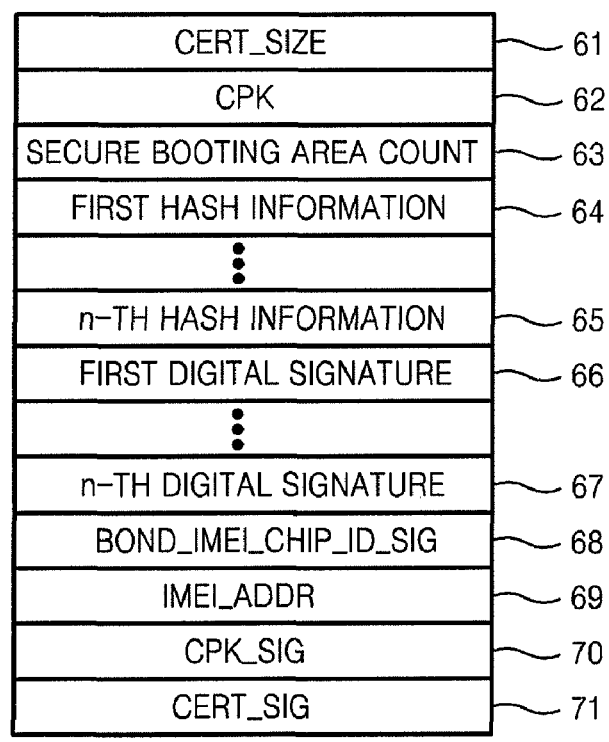
FIG. 6 illustrates the detailed structure of the certificate shown in FIG. 5 according to an exemplary embodiment of the present invention.

FIG. 6 illustrates the detailed structure of the certificate 56 shown in FIG. 5 according to an exemplary embodiment of the present invention. The certificate 56 includes a CERT_SIZE 61 indicating the size of the certificate 56; a CPK 62; a secure booting area count 63 indicating the number of areas, i.e., areas for a first hash information 64 through an n-th hash information 65 and a first digital signature 66 through an n-th digital signature 67, for the authentication of the application code 53 shown in FIG. 5; a BOND_IMEI_CHIP_ID_SIG 68 for preventing the change of an IMEI value; an IMEI_ADDR 69 indicating a position where the IMEI value is stored; a CPK_SIG 70 for CPK authentication; and a CERT_SIG 71 for authentication of the entire certificate 56. The BOND_IMEI_CHIP_ID_SIG 68 is a signature used to hinder booting when the IMEI value is changed.

Figure 7:
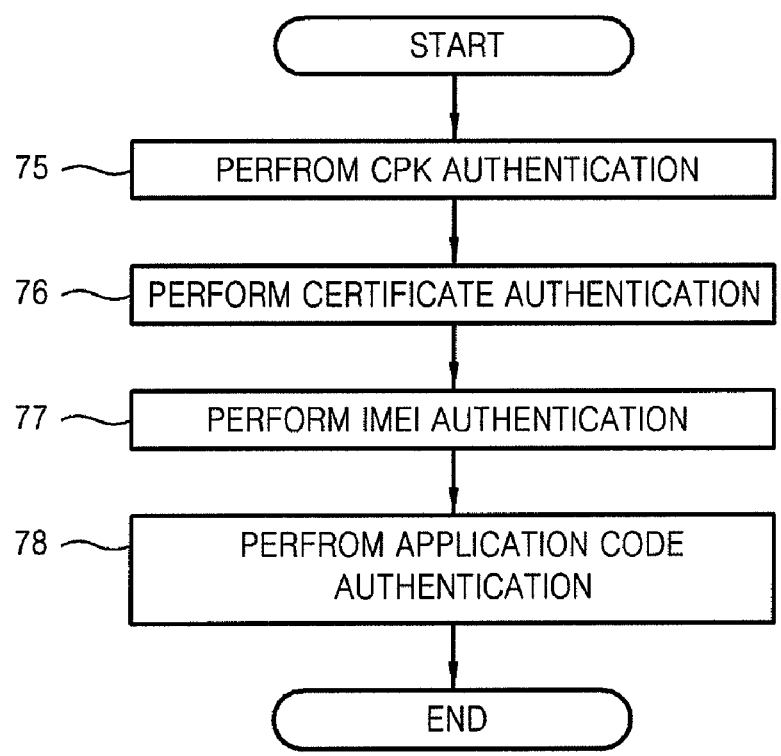
FIG. 7 is a flowchart of the security check in FIG. 2 according to an exemplary embodiment of the present invention.

The security check is performed according to the flowchart shown in FIG. 7. First, authentication of the CPK 62 is performed using the CPK_SIG 70 and the manufacturer's public key stored in the ROM 33 in operation 75. Next, authentication of the entire certificate 56 is performed using the CERT_SIG 71 in operation 76. Authentication of an IMEI is performed using the IMEI_ADDR 69 and the BOND_IMEI_CHIP_ID_SIG 68 in operation 77. Authentication of the application code 53 is performed using the secure booting area count 63, the first hash information 64 through the n-th hash information 65, and the first digital signature 66 through the n-th digital signature 67 in operation 78. If the authentication fails in each operation, the mobile terminal 3 is not booted.

Referring back to FIG. 2, when it is determined that the authentication has failed in operation 28, the mobile terminal 3 is not booted. When it is determined that the authentication has succeeded, the control unit 30 executes an application in operation 29. The control unit 30 copies the application code 53 to the RAM 32 using the SBC 54 shown in FIG. 5 and executes the application.

The invention can also be embodied as computer readable codes on a computer readable recording medium. The computer readable recording medium is any data storage device that can store data which can be thereafter read by a computer system. Examples of the computer readable recording medium include ROM, RAM, CD-ROMs, magnetic tapes, floppy disks, optical data storage devices. The computer readable recording medium can also be distributed over network coupled computer systems so that the computer readable code is stored and executed in a distributed fashion. While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A secure booting method for a mobile terminal, the secure booting method comprising:

checking whether configuration information is stored in a non-volatile memory in the mobile terminal when the mobile terminal is booted;

determining whether the configuration information is effective;

connecting the mobile terminal with a host to copy a downloader and a downloader certificate from the host when the checking determines that the configuration information is not stored in the non-volatile memory or the determining determines that the configuration information is not effective;

performing authentication of the copied downloader using the downloader certificate and an authentication key stored in the mobile terminal; and downloading a program stored in the host to the non-volatile memory by using the downloader when the downloader is authenticated.

2. The secure booting method of claim 1, wherein the connecting of the mobile terminal with the host to copy the downloader certificate comprises copying the downloader certificate comprising a first customer public key provided by a manufacturer of the mobile terminal, a first signature for the first customer public key, and a signature for the downloader.

3. The secure booting method of claim 2, wherein the performing of the authentication of the copied downloader comprises:

performing authentication of the first customer public key using the authentication key and the first signature for the first customer public key; and performing authentication of the downloader using the first customer public key and the signature for the downloader.

4. The secure booting method of claim 1, wherein the downloading of the program comprises downloading the program including configuration information about the non-volatile memory and a certificate.

5. The secure booting method of claim 4, further comprising:
   determining whether the mobile terminal is connected with the host when the mobile terminal is rebooted; and
   performing authentication of the certificate using the authentication key when-the mobile terminal has not been determined to be connected with the host.

6. The secure booting method of claim 5, wherein the downloading of the program further comprises downloading the program including an application code, and the certificate comprising information for authentication of the application code, a second customer public key provided by a manufacturer of the mobile terminal, information for preventing change of identification information for identifying the mobile terminal, information indicating a storage position of the identification information, a second signature for the second customer public key, and a signature for the certificate.

7. The secure booting method of claim 6, wherein the performing of the authentication of the certificate comprises:
   performing authentication of the second customer public key using the authentication key and the second signature for the second customer public key;
   performing authentication of the certificate using the signature for the certificate;
   performing authentication of the identification information using the information for preventing change of the identification information and the information indicating the storage position of the identification information; and
   performing authentication of the application code using the information for the authentication of the application code.

8. The secure booting method of claim 5, further comprising repeating the authentication of the copied downloader and the downloading of the program when the mobile terminal has been determined to be connected with the host.

9. The secure booting method of claim 1, further comprising:
   determining whether the mobile terminal has been connected with the host when the configuration information is determined to be effective; and
   performing authentication of a certificate in the program stored in the non-volatile memory using the authentication key when he mobile terminal has not been determined to be connected with the host.

10. The secure booting method of claim 9, wherein the downloading of the program further comprises downloading the program comprising an application code, and the certificate comprising information for authentication of the application code, a customer public key provided by a manufacturer of the mobile terminal, information for preventing change of identification information for identifying the mobile terminal, information indicating a storage position of the identification information, a signature for the customer public key, and a signature for the certificate.

11. The secure booting method of claim 10, wherein the performing of the authentication of the certificate comprises:
   performing authentication of the customer public key using the authentication key and the signature for the customer public key;
   performing authentication of the certificate using the signature for the certificate;
   performing authentication of the identification information using the information for preventing change of the identification information and the information indicating the storage position of the identification information; and
   performing authentication of the application code using the information for the authentication of the application code.

12. The secure booting method of claim 9, further comprising repeating the authentication of the copied downloader and the downloading of the program the mobile terminal has been determined to be connected with the host.

13. A computer readable recording medium tangibly storing a program for performing the secure booting method of claim 1.

14. A mobile terminal comprising:
   a memory storing a first program;
   a non-volatile memory; and
   a processor to execute the first program,
   wherein, according to the program, the processor checks whether configuration information is stored in the non-volatile memory in the mobile terminal and determines whether the configuration information is effective when the mobile terminal is booted; connects the mobile terminal with a host and copies a downloader and a downloader certificate from the host when the processor determines that the configuration information is not effective; performs authentication of the copied downloader using the downloader certificate and an authentication key stored in the mobile terminal; and downloads a second program stored in the host to the non-volatile memory using the downloader when the downloader is authenticated.

* * * * *